W. S. Stetson.
Mower.
No. 844. Reissued. Oct. 25. 1859.
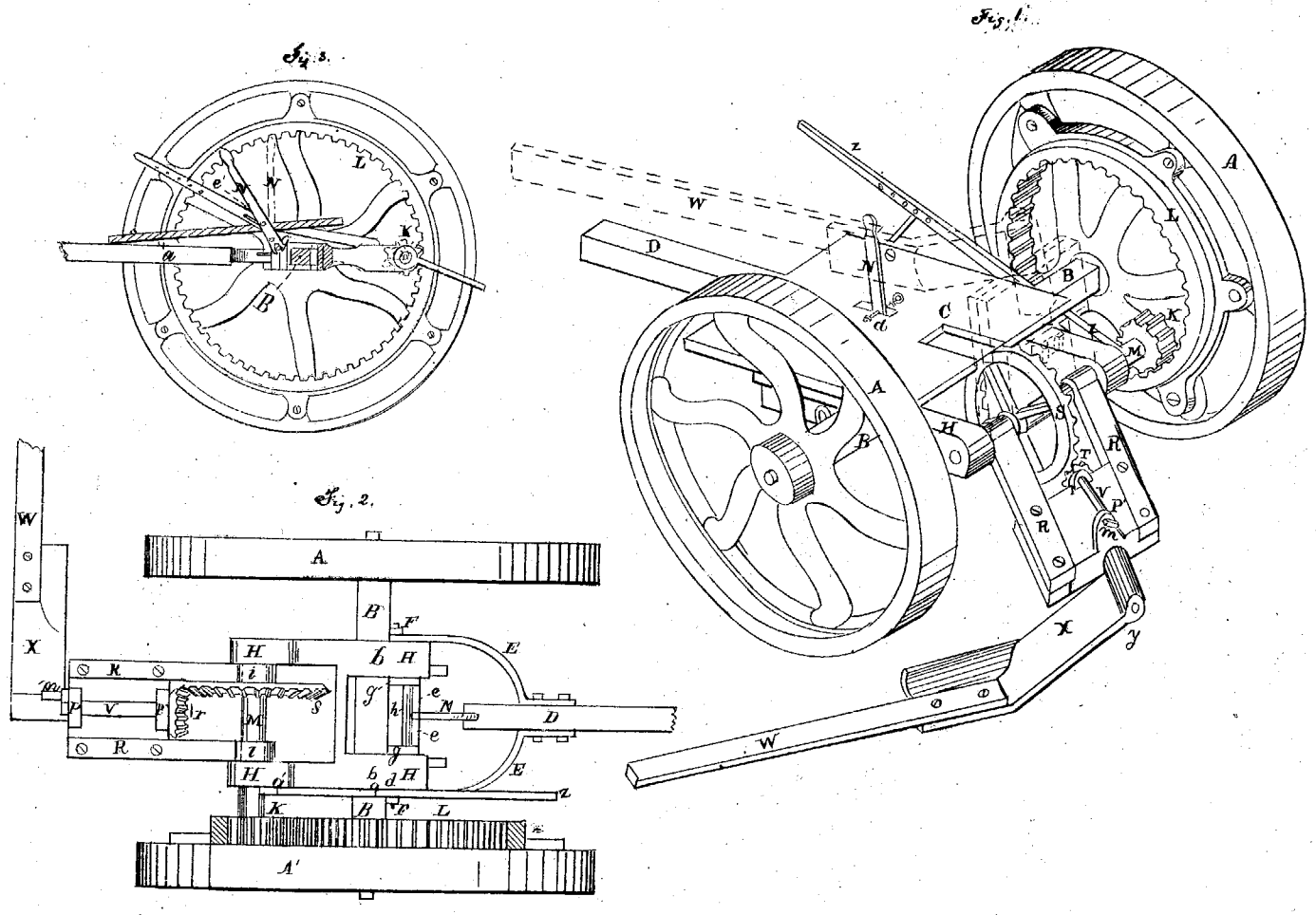
W. S. Stetson
Chas. G. Page
Wm. H. Harrison
Witnesses.

UNITED STATES PATENT OFFICE.

W. S. STETSON, OF BALTIMORE, MARYLAND.

IMPROVEMENT IN HARVESTERS.

Specification forming part of Letters Patent No. 23,508, dated April 5, 1859; Reissue No. 844, dated October 25, 1859.

DIVISION C.

*To all whom it may concern:*

Be it known that I, W. S. STETSON, of Baltimore, in the county of Baltimore and State of Maryland, have invented certain Improvements in Harvesting-Machines; and I do hereby declare that the following is a full, clear, and exact description of the principle or character which distinguishes them from all things before known, and of the usual manner of making, modifying, and using the same, reference being had to the accompanying drawings, of which—

Figure 1 is a perspective view of the machine; Fig. 2, a top view of the machine, the platform being removed; Fig. 3, a vertical longitudinal middle section of the parts between the carriage-wheels.

My invention consists in certain improvements in harvesting-machines, described and represented as follows:

A A′ are the carriage-wheels, turning upon the axle B. The platform C for the driver is attached fast to the pole D at the point *a*, and the pole is connected with the axle by the hounds E, the ends of which have their bearings and swivel in the lugs F, fixed to the axle. The axle, which is square or rectangular between the wheels, passes through openings in the forward ends of the two side bars of the rectangular frame H, these openings being sufficiently oblong to admit of a back-and-forth motion of the frame upon the axle for the purpose of throwing the pinion K, attached to this frame, in and out of gear with the internal gear, L, upon the driving-wheel A′, this pinion being upon the end of shaft M, which is supported and turns in the rear ends of the side bars, *b*, of the frame H. The motion of the frame is effected by the lever N, the fulcrum *d* of which is on the platform, the branching ends *e* of the lever below being open forks *g*, which stride the cross-bar *h*, fixed in the forward part of the frame, this being more clearly shown in the section in Fig. 3, where the section of the cross-bar is shown within the arms of the fork. The motion of the lever back and forth moves the frame and also the pinion to and from the cogs of the wheel L.

Fixed to the inside of the rear ends of the side bars, *b*, are projecting sleeves *i*, which embrace the shaft M, and serve as bearings for the forward ends of the vibrating second frame, R, which has a common center of motion with the shaft M.

Fixed to the shaft M is the main cog-wheel S, with its bevel-gear, which takes into the pinion T on the end of the crank-shaft V, to which the cutters are to be connected by the crank *m* and a connecting-rod, W, representing a portion of the finger-bar, upon which the knives are to be supported, these portions not being required to be shown here. The crank-shaft V is so supported in its bearings *p p′*, fixed to the frame R, that the line of its axis continued would intercept the axis of shaft M at right angles, the crank-shaft thus being always in a radial line to main cog-wheel S, however much the frame R may vibrate, so that the pinion T, and therefore the knives also, would work freely in any position of the vibrating frame R.

It is obvious that if the driving-pinion K were immovably connected with the pole D or the platform C, when the pole or carriage rises or falls in consequence of unevenness of the ground the pinion would turn faster or slower, according as its motion were in favor of or against its proper rotation derived from the internal gear, L. For instance, when the machine is advancing, if the pinion should be raised, this motion would turn the pinion backward—that is to say, contrary to its proper motion—and in consequence the knives would for the time move slower, cease to cut, or be reversed, according to the relative motions of the axis of the pinion upward and the motions of the internal gear, L. This difficulty I have remedied by making the vibratory motions of the frame H independent of the motions of the platform and pole, and giving the driver perfect control over the motions of the pinion by the lever Z in the manner just described.

It will be seen from the construction above described that the frame R may be swung under the machine and bring the cutter-bar forward of the axle. The crank-shaft would still be in a radial line to cog-wheel S. From the middle of the rear portion of the frame R is hung the drop piece or shoe X, which turns freely on an axis, *y*, supported in suitable bearings on the under side of the frame R, the cutter-bar being attached to this shoe. In consequence of the motion of frame R about axis M, and the motion of the drop piece or shoe X and the knife-bar about axis $y$, which is directly under and in a vertical plane with crank-shaft V, it will be seen that the knife-bar will readily accommodate or adjust itself to uneven surfaces of ground, and will also override readily small obstacles in the way. The position of axis $y$, just described, gives a nearly-uniform cut to the knives during the rise and fall of the knife-bar upon inequalities of the ground. It will be understood that if the axis $y$ were perfectly coincident with the axis of crank-shaft V the cut of the knives would be uniform, and that otherwise the knives would pass over the knife-bar to a greater or less extent, according to the elevation or depression of the knife-bar.

The attachment of the knife-bar to the frame R in the manner above described obviates to a great extent this difficulty, and gives nearly a uniform cut to the knives. My mode of adjusting the cut or set of the knives is as follows: At one side of the platform is a lever, $z$, having its fulcrum $x$ on the side of the platform, and its shorter arm connected with the side of frame H by a pivot-bolt, $a'$, the lever $z$ having a slot at $e'$, so that it may move over its fulcrum as the frame H is raised and lowered by its action, the slot allowing motion of the frame and platform independently of each other. The lever is also provided with holes to receive the stop-pin $a^2$, so as to set the lever at a required adjustment. According to the action of the lever in raising and lowering frame H will be the action in raising and lowering the points of the knives through the medium of the frame R and drop piece or shoe X and knife-bar W.

In harvesting-machines it is sometimes desirable to have the knife-bar lifted from the field and supported or "horsed" upon the carriage, so as to be out of the way in traveling about with the machine. It will be readily seen from the construction above described that I have accomplished the "horsing" of the knife-bar in a most simple, quick, convenient, and advantageous manner. The bar is raised first into an upright position, turning upon axis $y$, and is then carried upward and forward by lifting with it the frame R, which swings on axis M, and the bar is then moved onward in a forward direction until it lies over between the carriage-wheels in the position indicated by the red lines in Fig. 1. The cutter-bar is thus horsed in the position shown by only two movements, which are effected in (or nearly in, as may be) two vertical planes at right angles to each other, and lies at right angles to the axis of the driving-wheels, which I regard as the most convenient position for its transportation.

What I claim under this application, and desire to secure under this division of reissued Letters Patent, is—

1. The combination of shoe X with the vibrating frame R by means of axis $y$ at the rear end of said frame, as set forth.

2. Horsing or supporting the knife-bar in a position at right angles, or nearly so, to the carriage-axle by two movements, substantially as described.

W. S. STETSON.

Witnesses:
CHAS. G. PAGE.
WM. H. HARRISON.